United States Patent
Takahashi et al.

(10) Patent No.: US 11,319,254 B2
(45) Date of Patent: May 3, 2022

(54) ALUMINUM NITRIDE SINTERED BODY AND METHOD FOR PRODUCING SAME

(71) Applicant: MARUWA CO., LTD., Owariasahi (JP)

(72) Inventors: Mitsutaka Takahashi, Toki (JP); Genki Hirashima, Toki (JP); Daisuke Kato, Toki (JP)

(73) Assignee: MARUWA CO., LTD., Owariasahi (JP)

( * ) Notice: Subject to any disclaimer, the term of this patent is extended or adjusted under 35 U.S.C. 154(b) by 258 days.

(21) Appl. No.: 16/497,675

(22) PCT Filed: Sep. 19, 2018

(86) PCT No.: PCT/JP2018/034572
§ 371 (c)(1),
(2) Date: Sep. 25, 2019

(87) PCT Pub. No.: WO2020/059035
PCT Pub. Date: Mar. 26, 2020

(65) Prior Publication Data
US 2021/0323876 A1   Oct. 21, 2021

(51) Int. Cl.
*C04B 35/581* (2006.01)
*C04B 35/632* (2006.01)

(52) U.S. Cl.
CPC .......... *C04B 35/581* (2013.01); *C04B 35/632* (2013.01); *C04B 2235/3225* (2013.01); *C04B 2235/3886* (2013.01); *C04B 2235/428* (2013.01)

(58) Field of Classification Search
CPC .................................................. C04B 35/581
See application file for complete search history.

(56) References Cited

U.S. PATENT DOCUMENTS

| | | | | |
|---|---|---|---|---|
| 7,375,045 B2* | 5/2008 | Lee | ........................ | C04B 35/581 501/98.5 |
| 7,473,661 B2* | 1/2009 | Lee | ........................ | C04B 35/581 501/98.5 |
| 2006/0240972 A1* | 10/2006 | Lee | ........................ | C04B 35/581 501/98.5 |
| 2008/0111097 A1* | 5/2008 | Lee | ........................ | C04B 35/581 252/62 |
| 2013/0157445 A1* | 6/2013 | Miyashita | ............ | H01L 21/0254 438/478 |

FOREIGN PATENT DOCUMENTS

| | | |
|---|---|---|
| JP | H01-153573 A | 6/1989 |
| JP | H04-50171 A | 2/1992 |

(Continued)

*Primary Examiner* — Karl E Group
(74) *Attorney, Agent, or Firm* — Shumaker, Loop & Kendrick, LLP (57) ABSTRACT

An aluminum nitride sintered body with improved mechanical strength without compromised thermal dissipating properties. The aluminum nitride sintered body contains 100 parts by weight of AlN, 3 to 20 parts by weight on an oxide basis of at least one type of nitride selected from the group consisting of Zr and Ti as an additive, and 1 to 10 parts by weight of $Y_2O_3$ as a sintering aid. The oxygen content in the sintered body is 1.8 wt % or less, and the thermal conductivity is 130 W/m·K or higher.

1 Claim, 5 Drawing Sheets

(56) References Cited

FOREIGN PATENT DOCUMENTS

| | | | |
|---|---|---|---|
| JP | H05-221761 | A | 8/1993 |
| JP | H05-286767 | A | 11/1993 |
| JP | H07187788 | A | 7/1995 |
| JP | H08119742 | A | 5/1996 |
| JP | H11-199324 | A | 7/1999 |
| JP | 2002100826 | A | 4/2002 |
| JP | 3404813 | B2 | 5/2003 |
| JP | 2003-201179 | A | 7/2003 |
| JP | 2003201179 | A | 7/2003 |
| JP | 2011-37691 | A | 2/2011 |
| JP | 2016-098159 | A | 5/2016 |
| JP | 2016098159 | A | 5/2016 |
| JP | 6284609 | B2 | 2/2018 |
| WO | 2005008683 | A1 | 1/2005 |

* cited by examiner

ALUMINUM NITRIDE SINTERED BODY AND METHOD FOR PRODUCING SAME

FIELD OF THE INVENTION

The present invention relates to an aluminum nitride sintered body and a method for producing same.

BACKGROUND

Products employing aluminum nitride sintered bodies have excellent thermal conductivity and electrical insulation, making them attractive as material for highly thermally conductive substrates. Owing to their excellent thermal conductivity, aluminum nitride sintered bodies are widely used in semiconductors and electronic equipment that exhibit unstable operation in hot conditions, for example as power transistor module substrates, mounting substrates for light-emitting diodes (LEDs), and heat dissipating boards in electronic components such as IC packages.

In recent years, aluminum nitride sintered substrates are abundantly used in electronic substrates for mobile applications, and there is a demand for improved mechanical strength while maintaining thermal dissipation. Various attempts have been made to further improve the mechanical strength while maintaining a high thermal conductivity.

For example, Patent Document 1 discloses an aluminum nitride sintered body and a method for producing same. It is known from Patent Document 1 that by varying the types and amounts of sintering aids and other additives added to the aluminum nitride raw material powder, it is possible to increase the mechanical strength without compromising the heat dissipating properties. For example, the sintering aid facilitates densification and prevents oxygen impurities in the aluminum nitride (AlN) powder from permeating into the AlN crystal grain. Specific examples of such a sintering aid include oxides and nitrides of rare earth elements (Y, Sc, Ce, Dy, etc.) and oxides of alkaline earth metals (Ca). In particular, yttrium oxide ($Y_2O_3$), cerium oxide (CeO), and calcium oxide (CaO) are known to be preferable. In addition, a Si component used as an additive has the effect of improving sintering properties and lowering the sintering temperature. It is known that by adding this Si component in compound addition with the sintering aid, grain growth of the sintered body can be suppressed to form a fine AlN crystal structure, increasing the structural strength of the sintered body. It is further known that the addition of a Zr compound has the effect of further improving the sintering properties and suppressing aggregation of the liquid phase that can easily occur on the surface of the sintered body, thereby expanding the temperature range in which suitable sintering can be performed.

Patent Document 2 discloses a method for producing an aluminum nitride sintered body, the method characterized in that a primary mixing step is introduced in which a silicon compound, a sintering aid and other additives are mixed to create a primary mixture. By introducing this step, compared to a conventional aluminum nitride body in which aluminum nitride powder, powdered silicon compound, sintering aid and other additives are mixed at once, the mechanical strength (three-point flexural strength) was improved while at least maintaining the thermal conductivity. Meanwhile, as shown in Table 2 (Examples 1 to 7, and 13 to 22) of Patent Document 2, it is known that adding a suitable amount of partially stabilized zirconia increases the mechanical strength.

PRIOR ART DOCUMENTS

Patent Documents

Patent Document 1: Japanese Unexamined Patent Publication No. 2003-201179
Patent Document 2: Japanese Unexamined Patent Publication No. 2016-98159

SUMMARY OF THE INVENTION

Problem to be Solved by the Invention

It is known from Patent Document 1 that the addition of a Zr compound to an AlN sintered body lowers the sintering temperature and thus improves the sintering properties, i.e. mechanical strength, while an increase in the amount of the Zr compound lowers the thermal conductivity of the AlN sintered body. It is also known from Table 2 (Examples 1 to 7 and 13 to 22) of Patent Document 2 that adding a suitable amount of partially stabilized zirconia led to increased strength, but that the thermal conductivity decreased proportionally to the increase in strength as the amount of partially stabilized zirconia was increased. In other words, it is known that the improved mechanical strength obtained by adding a Zr compound has a tradeoff in the form of decreased thermal conductivity. In light of this, the inventors of the present invention identified the problem of suppressing the decrease in thermal conductivity due to the addition of a Zr compound, aiming to improve the situation.

The present invention was made in order to solve the aforementioned problem, and has an object of providing a aluminum nitride sintered body that has improved mechanical strength without compromising the heat dissipating properties, and a method for producing same.

Means for Solving the Problem

An aluminum nitride sintered body according to an embodiment of the present invention contains 100 parts by weight of AlN, 3 to 20 parts by weight on an oxide basis of at least one nitride selected from the group consisting of Zr and Ti as an additive, and 1 to 10 parts by weight of $Y_2O_3$ as a sintering aid, and is characterized in that the oxygen content in the sintered body is 1.8 wt % or less, and the thermal conductivity is 130 W/m·K or higher.

The aluminum nitride sintered body according to the embodiment of the present invention contains 3 to 20 parts by weight of at least one type of nitride selected from the group consisting of ZrN and TiN, and thus has improved mechanical strength compared to a sintered body that does not contain these nitrides. In addition, the oxygen content in the sintered body is suppressed to 1.8% or less, making for an aluminum nitride sintered body with a thermal conductivity of 130 W/m·K or higher.

An aluminum nitride sintered body according to a further embodiment of the present invention is characterized in that the sintering aid phase contains YAM and does not contain YAG as the crystal phase. It is generally known that when Zr ($ZrO_2$, ZrN, etc.) is added to an aluminum nitride sintered body, the sintering aid phase will mainly contain YAG ($Y_3Al_5O_{12}$) and YAL ($YAlO_3$) and will not contain YAM ($Y_4Al_2O_9$) (See Table 4 below). Compared to YAM and YAL, YAG has a higher ratio of oxygen to yttrium, and thus contains more oxygen. In the aluminum nitride sintered body according to the embodiment of the present invention, YAM is precipitated in the sintering aid instead of YAG.

Therefore, the aluminum nitride sintered body according to the embodiment of the present invention realizes a reduction in oxygen content in the sintered body, resulting in both high thermal conductivity and high mechanical strength.

In an aluminum nitride sintered body according to a further embodiment of the present invention, sintering properties can be improved and the sintering temperature lowered by optionally having the aluminum nitride sintered body contain 0.025 to 0.15 parts by weight of $SiO_2$ as an additive. Adding a suitable amount of the Si component in a compound addition with the sintering aid causes a suppression of grain growth in the sintered body, which works to form a fine AlN crystalline structure.

In an aluminum nitride sintered body according to a further embodiment of the present invention, the nitride is 5 to 20 parts by weight of ZrN, which realizes a higher thermal conductivity and mechanical strength.

A method for producing an aluminum nitride sintered body according to an embodiment of the present invention includes:
a mixing step of mixing an aluminum nitride raw material powder, an additive consisting of at least one type of nitride selected from the group consisting of Zr and Ti, a sintering aid, a Si additive, an organic binder, and an organic solvent to create a raw material mixture;
a forming step of forming the raw material mixture into a compact;
a first heating step of heating the compact in a nitrogen atmosphere in a first temperature range to partially debind the organic binder from the compact and leave the carbon component in the compact;
a second heating step of heating the compact in a nitrogen atmosphere in a second temperature range that is hotter than the first temperature range to remove the residual carbon from the compact without sintering the compact; and
following the second heating step, a sintering step of heating the compact in a nitrogen atmosphere in a third temperature range to sinter the compact.

As such, the method for producing an aluminum nitride sintered body according to the embodiment of the present invention is characterized in that at least one type of nitride powder is selected from the group consisting of Zr and Ti, and then a first heating step causing incomplete debinding, a second heating step causing decarbonization, and a sintering process are performed in a nitrogen atmosphere. Thus, by subjecting an AlN raw material mixture containing a nitride powder selected from the group consisting of Zr and Ti to a heating process in a nitrogen atmosphere to suppress oxidation, the present invention enables a reduction of oxygen content in the sintered body. In general, the greater the content of Zr and Ti compounds, the more oxygen is absorbed at high temperatures such as when debinding the organic binder and sintering. The absorbed oxygen can dissolve into the AlN particles and/or bond with the sintering aid $Y_2O_3$ to create YAG ($Y_3Al_5O_{12}$), and thus become the cause of a high final oxygen content of the sintered body. As a result, it is considered that the thermal conductivity decreases in reverse proportion to the increase in mechanical strength due to the addition of additives. By contrast, in the present invention, the first heating step (debinding process) is performed under conditions that intentionally leave residual carbon in the compact, so that in the second heating step (decarbonization process) the minute amounts of dissolved oxygen and residual carbon in the compact can be removed through a thermal reaction to further reduce the oxygen content. As a result, the decrease in thermal conductivity can be more effectively suppressed. In short, by partially (incompletely) debinding and decarbonizing an organic binder from an AlN raw material mixture containing nitride powder in a nitrogen atmosphere, the present invention provides an aluminum nitride sintered body realizing improved mechanical strength while suppressing a decrease in thermal conductivity.

Effects of the Invention

The present invention succeeded in reducing the oxygen content of an aluminum nitride sintered body to improve the mechanical strength without compromising the heat dissipating properties.

BRIEF DESCRIPTION OF THE DRAWINGS

FIG. 3 (a) shows the X-ray diffraction pattern of an aluminum nitride sintered body that has undergone debinding, decarbonization, and sintering in a nitrogen atmosphere according to the embodiment of the present invention, and FIG. 3 (b) shows, as a comparative example, the X-ray diffraction pattern of an aluminum nitride sintered body that has undergone debinding in a standard atmosphere and sintering in a nitrogen atmosphere.

DETAILED DESCRIPTION

Figure 1:
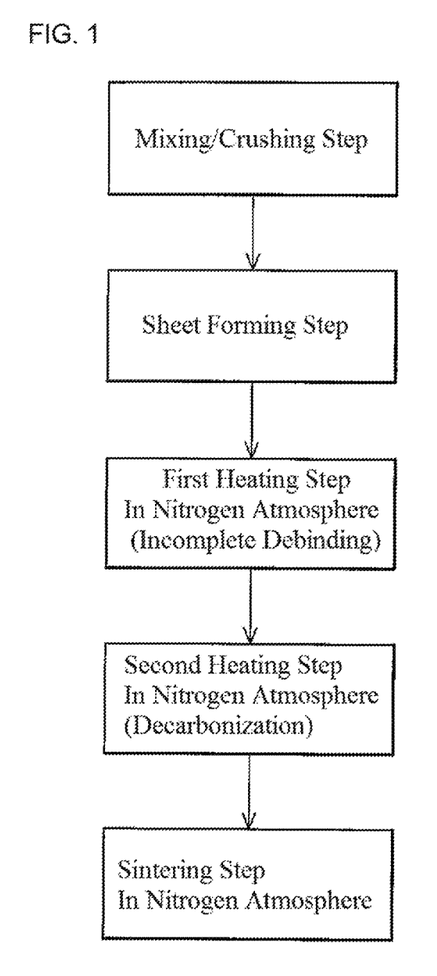
FIG. 1 is a flowchart showing a production method of an aluminum nitride sintered body according to an embodiment of the present invention.

An aluminum nitride sintered body substrate according to an embodiment of the present invention is produced through a mixing step of mixing an aluminum nitride raw material powder, an additive consisting of at least one type of nitride selected from the group consisting of Zr and Ti, a sintering aid, a Si additive, an organic binder, and an organic solvent to create a raw material mixture, a forming step of forming the raw material mixture into a compact, a first heating step (debinding process) of heating the compact in a nitrogen atmosphere in a first temperature range to partially (incompletely) debind the organic binder from the compact and leave the carbon component in the compact, a second heating step (decarbonization process) of heating the compact in a nitrogen atmosphere in a second temperature range to remove the residual carbon from the compact, and following the second heating step, a sintering step of raising the temperature from the second temperature range to a third temperature range and heating the compact in a nitrogen atmosphere in the third temperature range to sinter the compact. (See the flowchart of FIG. 1.)

The aluminum nitride sintered body according to the embodiment of the present invention is made by sintering a powder mixture containing 100 parts by weight of AlN, 3 to 20 parts by weight on an oxide basis of at least one nitride selected from the group consisting of Zr and Ti as an additive, and 1 to 10 parts by weight of $Y_2O_3$ as a sintering aid. "On an oxide basis" as used here means a value calculated by converting a compound containing a metallic element into an oxide of the metallic element. Specifically, ZrN and TiN were added upon being converted to ZrO and $TiO_2$.

First, in the mixing step, a suitable amount of aluminum nitride raw material powder, a suitable amount of additive powder, a suitable amount of sintering aid powder, and a suitable amount of Si additive powder or gel are prepared. The aluminum nitride raw material powder used as the base material and the nitride powder used as an additive are preferably fine powders of a high purity, with few metallic impurities and low oxygen content. The sintering aid is $Y_2O_3$. In addition, the Si additive may be at least one type selected from the group consisting of $SiO_2$, amorphous $SiO_2$, silicon alkoxide hydrolysate, etc.

The prepared raw materials (aluminum nitride, additives, sintering aid, and Si additive) are introduced into a crushing/mixing machine such as a ball mill, an organic solvent, a dispersing agent, an organic binder, and/or a plasticizer are added, and the mixture is thoroughly crushed and mixed for a predetermined amount of time. The organic solvent is prepared by mixing for example toluene and ethanol in a predetermined ratio. The amount of the organic solvent is about 30 to 50 parts by weight with the aluminum nitride raw material powder as 100 parts by weight. The dispersing agent is for example a trace amount of a phosphorus-based surfactant. However, the organic solvent and the dispersing agent may be selected freely. Further, the organic binder may be for example a polyvinyl butyral resin, and is added in an amount of about 5 to 10 parts by weight with the raw material powder as 100 parts by weight. The plasticizer may be for example dibutyl phthalate (DBP), and is added in an amount of about 1 to 5 parts by weight with the raw material powder as 100 parts by weight. The ingredients are mixed until a slurry-like raw material mixture is obtained, in which all ingredients are sufficiently dispersed and mixed.

In the forming step, the obtained raw material mixture is formed into a compact having a predetermined shape, by means of extrusion, cast molding, a doctor blade method or the like.

Next, in the first heating step (debinding process) the compact is introduced into a first heating apparatus (oven) and is heated for an hour or longer in a first temperature range in a nitrogen atmosphere at atmospheric pressure (although the step is not so limited), so that the added organic binder is partially or incompletely debinded and removed. The first temperature range is at this time about 400° C. to 600° C. (so as not to sinter the compact). In other words, by heating the compact under conditions such that the debinding process is incomplete, the carbon component of the organic binder is intentionally left in the compact. The residual carbon content in the compact after the first heating step can be quantifiably detected using oxygen airflow combustion-infrared absorptiometry. Debinding processing conditions are defined such that the carbon content in the compact after the first heating step is preferably 0.3 wt % to 1 wt %, and more preferably 0.4 wt % to 0.8 wt %. In other words, the method for producing the aluminum nitride sintered body according to the embodiment of the present invention further includes a step of measuring the carbon content in a sample of the compact after the first heating step, and then, based on the measured results of the carbon content in the sample, determining the heating conditions for the debinding process of the compact. It is thought that by heating the organic binder in a nitrogen atmosphere, oxidation of the additives at the time of debinding can be suppressed, and compared to a standard atmosphere (an oxygen atmosphere into which air is introduced) carbon can be effectively made to remain without excessive combustion. Following the first heating step (debinding process), the second heating step (decarbonization step) and the sintering step are performed in sequence. In the present embodiment, the first heating step and the second heating step and sintering step are carried out using different heating apparatuses, but they may also be carried out in sequence using the same heating apparatus.

In the second heating step (decarbonization process), the incompletely debinded compact is introduced into a second heating apparatus and is heated for one hour or longer in a second temperature range in a nitrogen atmosphere at atmospheric pressure (although the step is not so limited), so that the residual carbon in the compact is removed. The second temperature range is at this time about 1400° C. to 1700° C. (so as not to sinter the compact). In this decarbonization step preceding the sintering step, the trace amounts of oxygen dissolved in the compact (e.g. within the AlN particles) and the residual carbon can be subjected to a high-temperature thermal reaction and be completely debinded, allowing for a further reduction of oxygen content.

In the sintering step, the decarbonized compact is sintered through heating for one hour or longer in the second heating apparatus in a third temperature range in a nitrogen atmosphere at atmospheric pressure (although the step is not so limited). The third temperature range is about 1700° C. to 1800° C. At this time, due to the addition of a minute amount of the Si component, the compact can be sintered at a relatively low temperature of less than 1800° C. In this way, a substrate of an aluminum nitride sintered body is obtained.

Figure 3:
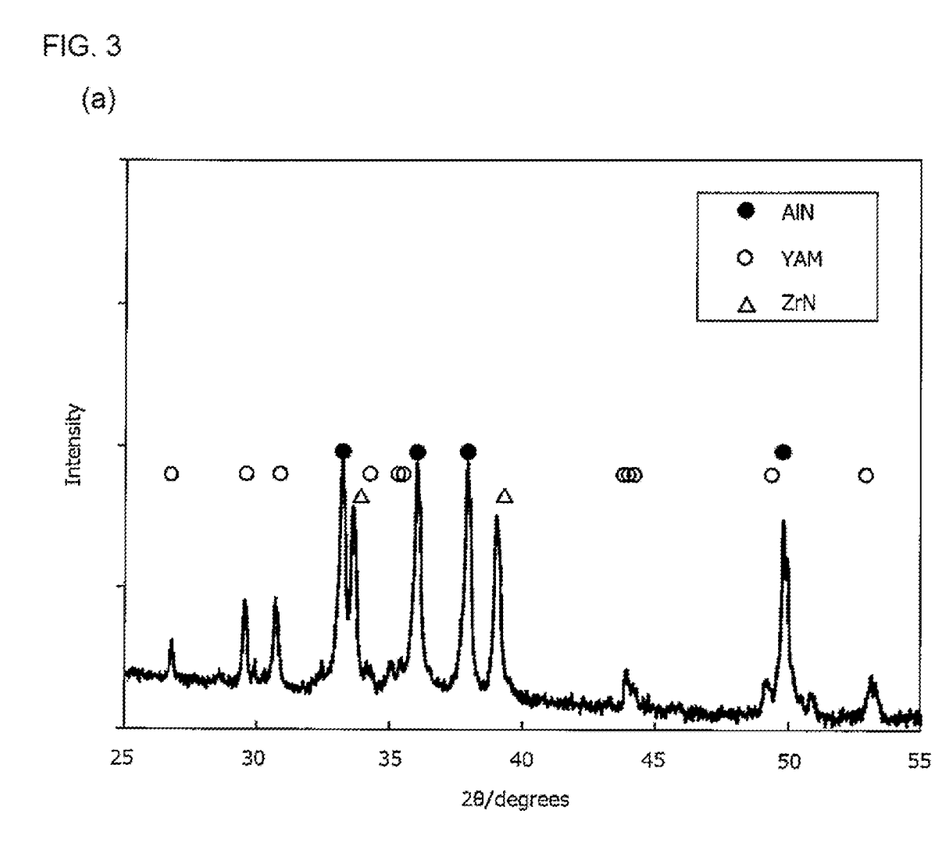

The crystal phase of the aluminum nitride sintered body was identified by X-ray diffraction. FIG. 3 (a) shows the typical X-ray diffraction pattern of the aluminum nitride sintered body produced according to the steps of the present embodiment (corresponding to Example 1 described later). Meanwhile, FIG. 3 (b) shows the typical X-ray diffraction pattern of an aluminum nitride sintered body produced by a conventional production method for comparison (corresponding to Comparative Example 1 described below). In the X-ray diffraction patterns shown in FIG. 3, ZrN was used as an additive for exemplary purposes.

Figure 2:
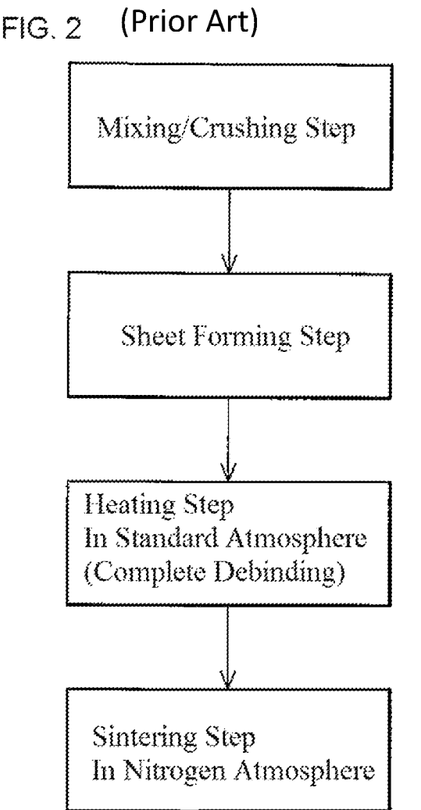
FIG. 2 is a flowchart showing a production method of a conventional aluminum nitride sintered body (comparative example).

As shown in the flowchart of FIG. 2, a comparative sample of an aluminum nitride sintered body was produced through the following steps: a mixing step of mixing an additive (ZrN), a sintering aid, a Si additive, an organic binder, and an organic solvent to create a raw material mixture, a forming step of forming the raw material mixture into a compact, a first heating step of heating the compact in a standard atmosphere (oxygen atmosphere into which air is introduced) to completely debind the organic binder from the compact, and a sintering step of heating the compact in a nitrogen atmosphere to sinter the compact. The conventional method thus differs from the production method according to the embodiment of the present invention in that the debinding step is performed in standard atmosphere, and that the organic binder is completely debinded in the debinding process (meaning that there is no decarbonization process step). More specifically, under the incomplete debinding conditions of the embodiment of the present invention, debinding processing is performed until the carbon content in the compact after the first heating step becomes 0.3 wt % to 1.0 wt % (more preferably 0.4 wt % to 0.8 wt %). By contrast, under the complete debinding conditions in the comparative sample, debinding processing is performed until the carbon content in the compact after debinding becomes 0.05 wt % to 0.25 wt %.

From the X-ray diffraction pattern of the aluminum nitride sintered body according to the embodiment of the present invention shown in FIG. 3 (a), in addition to the peaks of the crystal phase of AlN, the peaks of the crystal phases of YAM and ZrN can also be confirmed. Meanwhile, from the X-ray diffraction pattern of the aluminum nitride sintered body of the comparative example shown in FIG. 3 (b), in addition to the peaks of the crystal phase of AlN, the peaks of the crystal phases of YAG and ZrN can be confirmed. As shown in FIG. 3, it is understood that the aluminum nitride sintered body having undergone both debinding and decarbonization in a nitrogen atmosphere according to the present embodiment is structurally different from an aluminum nitride body having undergone only a debinding process in a standard atmosphere. Further, since YAG has a higher oxygen to yttrium ratio than YAM, it is understood that the latter aluminum nitride sintered body contains more oxygen. Apart from Zr, this trend was also observed in Ti.

It is thus understood that the aluminum nitride sintered body according to the present embodiment has an effectively reduced oxygen content due to the formation of YAM instead of YAG in the sintering aid phase. As a result, it can enjoy the benefit of improved mechanical strength by the addition of Zr or Ti, while suppressing a decrease in thermal conductivity.

The properties of the aluminum nitride sintered body according to the present embodiment were assessed by performing thermal conductometry, flexural strength measurement, and crystal phase identification by X-ray diffraction on the aluminum nitride sintered body.

EXAMPLES

The present invention is described below in further detail based on examples and comparative examples, but it should be noted that the invention is not limited to these examples.

The aluminum nitride sintered bodies according to Examples 1 to 11 were created by performing some or all of the steps described below.

(1) A predetermined amount of aluminum nitride powder was prepared. The aluminum nitride powder used had an average grain size of 1.1 μm and a specific surface area of 2.6 m²/g.

(2) As the sintering aid, a high-purity yttrium oxide ($Y_2O_3$) powder was prepared. It is already known in this technical field that an amount of sintering aid of 1 to 10 parts by weight is preferable. In all of these Examples, the amount was set to 5 parts by weight for the purpose of relative assessment between samples.

(3) As the optional additive, ZrN powder (for Examples 1 to 7) and TiN powder (for Examples 8 to 11) were prepared.

(4) A predetermined amount of silica sol was prepared as a colloidal silicon compound (for Examples 1 to 4 and 6 to 11). A suitable amount of silica sol was prepared based on an additive amount on a Si element basis, with the aluminum nitride raw material powder as 100 parts by weight.

(5) Suitable amounts of each raw material was added to the aluminum nitride raw material powder to prepare a raw material composition. At the time of preparation, Y, and ZrN or TiN were calculated on an oxide basis, and the Si component was calculated on a Si element basis, and mixed.

(6) The raw materials were introduced into a ball mill in steps, where they were crushed and mixed.

(7) The raw material mixture was formed into a sheet using the doctor blade method, and punched into a desired shape.

(8) The sheet-shaped compact of the raw material mixture in packed powder form was introduced into an oven, where it was heated and debinded for about two hours at a temperature of about 500° C. in a nitrogen atmosphere at a pressure of 1 atm, to control the amount of residual carbon. The debinded sheet compact was then removed from the oven and introduced into a different oven, where it was heated and decarbonized for about 10 hours at a temperature of about 1,500° C. in a nitrogen gas atmosphere at a pressure of 1 atm. At this temperature, the sheet compact is not sintered. Then, in the same oven, the sheet compact was heated for about 5 hours at a temperature of about 1,800° C. in a nitrogen gas atmosphere at a pressure of 1 atm to sinter the sheet compact and obtain an aluminum nitride sintered body substrate according to Examples 1 to 11.

The aluminum nitride sintered body according to Comparative Examples 1 to 4 and 6 to 14 was obtained through the steps (1) to (7) described above, but under different heating conditions than those of step (8). Specifically, the sheet-shaped compact of the raw material mixture in packed powder form was introduced into an oven, where it was heated and debinded for about two hours at a temperature of about 500° C. in a standard atmosphere (an oxygen atmosphere into which air is introduced) at a pressure of 1 atm, so that no carbon component remained. The debinded sheet compact was then removed from the oven and introduced into a different oven, where it was heated for about five hours at a temperature of about 1,800° C. in a nitrogen gas atmosphere at a pressure of 1 atm to sinter the sheet compact and obtain an aluminum nitride sintered body substrate according to Comparative Examples 1 to 4 and 6 to 14. Meanwhile, the aluminum nitride sintered body according to Comparative Example 5 was obtained under the same heating conditions as those of step (8).

The structure and production conditions of the aluminum nitride sintered bodies of Examples 1 to 11 and Comparative Examples 1 to 14 are shown in Table 1 below. In Table 1, the "Debinding/Decarbonization in N Atmosphere" column is marked "Y" for the samples made according to the flowchart shown in FIG. 1, and is marked with an "N" for the samples made according to the flowchart shown in FIG. 2. For a portion of the samples in the Examples and Comparative Examples made under the conditions described above, the carbon content in the aluminum nitride sintered body after debinding and after sintering was measured, and the presence of residual carbon was quantifiably confirmed. The carbon content measurement was done through oxygen airflow combustion-infrared absorptiometry using an EMIA-221V made by HORIBA, Ltd. As shown in Table 1, it was confirmed that under the conditions of the Examples, residual carbon in the compact after debinding is controlled to be 0.4 to 0.8 wt %. On the other hand, in the samples after decarbonization (or sintering) and the samples of the Comparative Examples, the residual carbon content was about 0.1 to 0.2 wt %.

TABLE 1

| | Main agent AlN | Sintering aid $Y_2O_3$ | ZrN (Oxide Basis) | $ZrO_2$ (Oxide Basis) | TiN (Oxide Basis) | Si Additive Si | Debinding/ Decarbonization in N Atmosphere | Carbon Content (wt %) After Debinding | Carbon Content (wt %) After Sintering |
|---|---|---|---|---|---|---|---|---|---|
| Example 1 | 100 | 5 | 3 | | | 0.05 | Y | 0.50 | 0.15 |
| Example 2 | 100 | 5 | 5 | | | 0.05 | Y | 0.55 | |
| Example 3 | 100 | 5 | 10 | | | 0.05 | Y | 0.66 | |
| Example 4 | 100 | 5 | 20 | | | 0.05 | Y | 0.75 | |
| Example 5 | 100 | 5 | 3 | | | 0.00 | Y | 0.49 | |
| Example 6 | 100 | 5 | 3 | | | 0.10 | Y | 0.51 | |
| Example 7 | 100 | 5 | 3 | | | 0.20 | Y | 0.51 | |
| Example 8 | 100 | 5 | | | 3 | 0.05 | Y | 0.48 | 0.09 |
| Example 9 | 100 | 5 | | | 5 | 0.05 | Y | | |
| Example 10 | 100 | 5 | | | 10 | 0.05 | Y | | |
| Example 11 | 100 | 5 | | | 20 | 0.05 | Y | | |
| Comparative Example 1 | 100 | 5 | 3 | | | 0.05 | N | 0.09 | 0.09 |
| Comparative Example 2 | 100 | 5 | 5 | | | 0.05 | N | 0.12 | |
| Comparative Example 3 | 100 | 5 | 10 | | | 0.05 | N | 0.19 | |
| Comparative Example 4 | 100 | 5 | 20 | | | 0.05 | N | 0.25 | |
| Comparative Example 5 | 100 | 5 | | 10 | | 0.05 | Y | | |
| Comparative Example 6 | 100 | 5 | | 10 | | 0.05 | N | | |
| Comparative Example 7 | 100 | 5 | 3 | | | 0.00 | N | 0.08 | |
| Comparative Example 8 | 100 | 5 | 3 | | | 0.10 | N | 0.09 | |
| Comparative Example 9 | 100 | 5 | 3 | | | 0.20 | N | 0.11 | |
| Comparative Example 10 | 100 | 5 | | | 3 | 0.05 | N | 0.08 | 0.08 |
| Comparative Example 11 | 100 | 5 | | | 5 | 0.05 | N | | |
| Comparative Example 12 | 100 | 5 | | | 10 | 0.05 | N | | |
| Comparative Example 13 | 100 | 5 | | | 20 | 0.05 | N | | |
| Comparative Example 14 | 100 | 5 | | | | 0.05 | N | | |

Properties A to D of the aluminum nitride sintered bodies according to Examples 1 to 11 and Comparative Examples 1 to 14 shown in Table 1 were assessed using the following methods.

A. Three-Point Flexural Strength

For the three-point flexural strength measurement, a three-point flexural test based on the JIS-R1601 standard was used. The measuring device was a model AG-IS made by Shimadzu Corporation, and the measuring conditions were a crosshead speed of 0.5 mm/min, a distance between the supports of 30 mm, a specimen width of 20 mm, and a specimen thickness of 0.3 to 0.4 mm.

B. Thermal Conductivity

For the conductivity measurement, a laser flash technique based on the JIS-R1611 standard was used. A TC-9000 system made by ULVAC, Inc. was used for the measuring.

C. Oxygen Content

Using an EMGA-920 made by HORIBA, Ltd., measuring was performed by means of inert gas fusion-nondispersive infrared absorptiometry.

D. Crystal Phase Identification

X-ray diffraction using Cu-Kα rays was used for the crystal phase identification. An UltimaIV apparatus made by Rigaku Corporation was used for the measuring.

Part or all of the properties of the aluminum sintered bodies according to the Examples are shown in Tables 2 to 5 below. As for the composition ratio, the Tables show, relative to a 100 parts by weight of AlN, the parts by weight of $Y_2O_3$, the parts by weight of ZrN, $ZrO_2$, and TiN on an oxide basis, as well as the parts by weight of the silicon compound on a Si element basis.

Table 2 shows the measurements of the flexural strength, thermal conductivity, and oxygen content of Examples 1 to 4 and Comparative Examples 1 to 6, where the additive was Zr. As such, Table 2 shows the type (additive form) of the additives (ZrN, $ZrO_2$), and the tendency of each property depending on the amount added.

TABLE 2

| | Added Amount (Parts by Weight) | | | | | Debinding/ | Three-point | | |
|---|---|---|---|---|---|---|---|---|---|
| | | | Additive | | | | | | |
| | Main agent AlN | Sintering aid Y₂O₃ | ZrN (Oxide Basis) | ZrO₂ (Oxide Basis) | Si Additive Si | Decarbonization in N Atmosphere | Flexural Strength (MPa) | Thermal Conductivity (W/mK) | Oxygen Content (wt %) |
| Example 1 | 100 | 5 | 3 | | 0.05 | Y | 686 | 147 | 1.29 |
| Example 2 | 100 | 5 | 5 | | 0.05 | Y | 691 | 147 | 1.32 |
| Example 3 | 100 | 5 | 10 | | 0.05 | Y | 698 | 144 | 1.39 |
| Example 4 | 100 | 5 | 20 | | 0.05 | Y | 791 | 146 | 1.50 |
| Comparative Example 1 | 100 | 5 | 3 | | 0.05 | N | 677 | 144 | 2.06 |
| Comparative Example 2 | 100 | 5 | 5 | | 0.05 | N | 701 | 107 | 2.29 |
| Comparative Example 3 | 100 | 5 | 10 | | 0.05 | N | 721 | 84 | 2.78 |
| Comparative Example 4 | 100 | 5 | 20 | | 0.05 | N | 735 | 81 | 3.18 |
| Comparative Example 5 | 100 | 5 | | 10 | 0.05 | Y | 743 | 85 | 3.25 |
| Comparative Example 6 | 100 | 5 | | 10 | 0.05 | N | 723 | 75 | 3.77 |

From the results shown in Table 2, it can be seen in Examples 1 to 4 and Comparative Examples 1 to 4 that, although there is a degree of variation in the measurements, increasing the added amount of ZrN leads to an overall improvement of the three-point flexural strength. In the Comparative Examples, it can be seen that thermal conductivity greatly decreases as the added amount of ZrN is increased, and that the oxygen content increases greatly in reverse proportion to the thermal conductivity. On the other hand, in the present Examples the thermal conductivity remains almost constant even as the added amount of ZrN is increased, and the increase in oxygen content is slight. In Example 4 in particular (where the added amount of ZrN was 20 parts by weight) a very high standard of strength and thermal conductivity was achieved, with a three-point flexural strength of 791 MPa and a thermal conductivity of 146 W/mK. In other words, in Examples 1 to 4 mechanical strength was improved while the increase in oxygen content and decrease in thermal conductivity was suppressed. Meanwhile, in Comparative Examples 5 and 6 where the additive was Zr oxide (ZrO₂), compared to Example 3, the decrease in thermal conductivity was significant, and introducing the debinding and decarbonization process in a nitrogen atmosphere made almost no improvement to the thermal conductivity. In other words, using an oxide as the additive greatly increases the oxygen content compared to when using a nitride as the additive, and although the introduction of the debinding and decarbonization process in a nitrogen atmosphere results in a slight reduction of the oxygen content, the effect is insufficient, and the decrease in thermal conductivity is barely suppressed at all. It can thus be understood from these results that the combination of the nitride additive and the debinding and decarbonization process in a nitrogen atmosphere makes a significant contribution to achieving both high strength and high thermal conductivity.

Table 3 shows the measurements of the oxygen content in Examples 1 and 5 to 7 and Comparative Examples 1 and 7 to 9. As such, Table 3 shows the tendency of the oxygen content depending on the added amount of Si additive.

TABLE 3

| | Added Amount (Parts by Weight) | | | | Debinding/ | |
|---|---|---|---|---|---|---|
| | | | Additive | | | |
| | Main agent AlN | Sintering aid Y₂O₃ | ZrN (Oxide Basis) | Si Additive Si | Decarbonization in N Atmosphere | Oxygen Content (wt %) |
| Example 1 | 100 | 5 | 3 | 0.05 | Y | 1.29 |
| Example 5 | 100 | 5 | 3 | 0.00 | Y | 1.14 |
| Example 6 | 100 | 5 | 3 | 0.10 | Y | 0.99 |
| Example 7 | 100 | 5 | 3 | 0.20 | Y | 1.37 |
| Comparative Example 1 | 100 | 5 | 3 | 0.05 | N | 2.06 |
| Comparative Example 7 | 100 | 5 | 3 | 0.00 | N | 1.99 |
| Comparative Example 8 | 100 | 5 | 3 | 0.10 | N | 2.07 |

TABLE 3-continued

|  | Added Amount (Parts by Weight) | | | | | |
| --- | --- | --- | --- | --- | --- | --- |
|  | Main agent AlN | Sintering aid $Y_2O_3$ | Additive ZrN (Oxide Basis) | Si Additive Si | Debinding/ Decarbonization in N Atmosphere | Oxygen Content (wt %) |
| Comparative Example 9 | 100 | 5 | 3 | 0.20 | N | 2.15 |

As seen in Table 3, changing the added amount of the Si additive does not exhibit much influence on the oxygen content. Comparing Examples 1 and 5 to 7 with Comparative Examples 7 to 9, it can be seen that the introduction of the debinding and decarbonization process in a nitrogen atmosphere causes a relative reduction of the oxygen content. It is thus understood that even if the added amount of the Si additive is changed, the decrease in thermal conductivity (increase in oxygen content) is suppressed according to the same tendency shown in Table 2.

Table 4 shows the measurements of the flexural strength, thermal conductivity, and oxygen content of Examples 8 to 11 and Comparative Examples 10 to 13, where the additive was Ti. As such, Table 4 shows the tendency of each property depending on the amount of additive (TiN).

Comparative Examples, it can be seen that thermal conductivity greatly decreases as the added amount of TiN is increased, and that the oxygen content increases greatly in reverse proportion to the thermal conductivity. On the other hand, in the present Examples the thermal conductivity decreases only slightly as the added amount of TiN is increased, and the increase in oxygen content is also slight. In Example 11 in particular (where the added amount of TiN was 20 parts by weight) a very high standard of strength and thermal conductivity was achieved, with a three-point flexural strength of 691 MPa and a thermal conductivity of 139 W/mK. In other words, in Examples 8 to 11 mechanical strength was improved while the decrease in thermal conductivity (increase in oxygen content) was suppressed.

TABLE 4

|  | Added Amount (Parts by Weight) | | | | | | | |
| --- | --- | --- | --- | --- | --- | --- | --- | --- |
|  | Main agent AlN | Sintering aid $Y_2O_3$ | Additive TiN (Oxide Basis) | Si Additive Si | Debinding/ Decarbonization in N Atmosphere | Three-point Flexural Strength (MPa) | Thermal Conductivity (W/mK) | Oxygen Content (wt %) |
| Example 8 | 100 | 5 | 3 | 0.05 | Y | 652 | 145 | 0.99 |
| Example 9 | 100 | 5 | 5 | 0.05 | Y | 653 | 140 | 1.15 |
| Example 10 | 100 | 5 | 10 | 0.05 | Y | 663 | 138 | 1.20 |
| Example 11 | 100 | 5 | 20 | 0.05 | Y | 691 | 139 | 1.32 |
| Comparative Example 10 | 100 | 5 | 3 | 0.05 | N | 663 | 143 | 2.11 |
| Comparative Example 11 | 100 | 5 | 5 | 0.05 | N | 675 | 100 | 2.44 |
| Comparative Example 12 | 100 | 5 | 10 | 0.05 | N | 678 | 88 | 3.26 |
| Comparative Example 13 | 100 | 5 | 20 | 0.05 | N | 711 | 80 | 4.91 |

From the results shown in Table 4, it can be seen in Examples 8 to 11 and Comparative Examples 10 to 13 that, although there is a degree of variation in the measurements, increasing the added amount of TiN leads to an overall improvement of the three-point flexural strength. In the Table 5 shows the crystal phases of the sintering aid phases detected by X-ray diffraction patterns in the samples where the added amount of ZrN additive was changed (Examples 1, 3, and 4, and Comparative Examples 1, 3, 4, and 14).

TABLE 5

|  | Added Amount (Parts by Weight) | | | | | Crystal Phase of the Sintering Aid Phase | | |
| --- | --- | --- | --- | --- | --- | --- | --- | --- |
|  | Main agent AlN | Sintering aid $Y_2O_3$ | Additive ZrN (Oxide Basis) | Si Additive Si | Debinding/ Decarbonization in N Atmosphere | YAM | YAL | YAG |
| Example 1 | 100 | 5 | 3 | 0.05 | Y | Y | N | N |
| Example 3 | 100 | 5 | 10 | 0.05 | Y | Y | N | N |
| Example 4 | 100 | 5 | 20 | 0.05 | Y | Y | Y | N |
| Comparative Example 1 | 100 | 5 | 3 | 0.05 | N | N | Y | Y |

TABLE 5-continued

| | Added Amount (Parts by Weight) | | | | | | | |
|---|---|---|---|---|---|---|---|---|
| | Main agent | Sintering aid | Additive ZrN (Oxide Basis) | Si Additive | Debinding/ Decarbonization in N | Crystal Phase of the Sintering Aid Phase | | |
| | AlN | $Y_2O_3$ | | Si | Atmosphere | YAM | YAL | YAG |
| Comparative Example 3 | 100 | 5 | 10 | 0.05 | N | N | N | Y |
| Comparative Example 4 | 100 | 5 | 20 | 0.05 | N | N | N | Y |
| Comparative Example 14 | 100 | 5 | 0 | 0.05 | N | Y | Y | N |

As seen in Table 5, if no additive is added, like in Comparative Example 14, then even with debinding in standard atmosphere and sintering in a nitrogen atmosphere, YAM and YAL are deposited as the crystal phase of the sintering aid phase, and YAG is not deposited. By contrast, when ZrN is added under the conditions of debinding in standard atmosphere and sintering in a nitrogen atmosphere (as in Comparative Examples 1, 3, and 4), deposition of YAM disappears, and YAG and partially YAL are deposited. In particular, when the added amount of ZrN increases to 10 to 20 parts by weight, deposition of YAL as the crystal phase of the sintering aid phase disappears, and of the three crystal phases only YAG is deposited. On the other hand, in the samples of Examples 1, 3, and 4, where the debinding and decarbonization process in a nitrogen atmosphere is introduced, YAG is not deposited as the crystal phase of the sintering aid phase, whereas YAM and partially YAL are deposited. When the added amount of ZrN becomes particularly small, deposition of YAL as the crystal phase of the sintering aid phase disappears, and of the three crystal phases only YAM is deposited. In other words, these results corroborate the influence of the debinding and decarbonization process in a nitrogen atmosphere according to the present invention on the oxygen content and thermal conductivity.

Therefore, by adding Zr or Ti in the form of nitrides and introducing the debinding and decarbonization process in a nitrogen atmosphere, the aluminum nitride sintered body and the method for producing the same according to the present embodiment (Examples 1 to 11) realizes a relative improvement of the thermal conductivity compared to an aluminum nitride sintered body of the same composition that does not introduce the aforementioned process.

(Variant)

Figure 4:
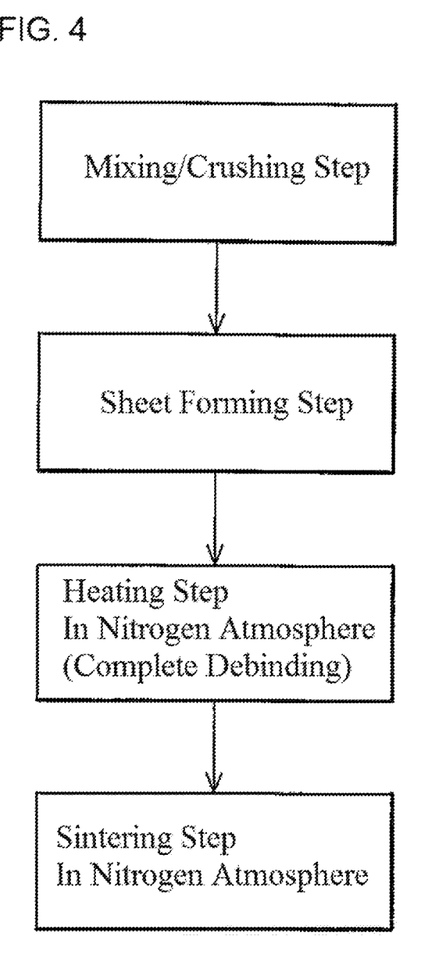
FIG. 4 is a flowchart showing a production method of an aluminum nitride sintered body according to a variant of the present invention.

Even if the step of decarbonization in a nitrogen atmosphere of the raw material mixture to which nitride is added is omitted as shown in the flowchart of FIG. 4, it is thought that, in contrast to the production process shown in the flowchart of FIG. 2, an equivalent effect to that of the aforementioned embodiment is achieved if the debinding step and the sintering step in a nitrogen atmosphere are performed. In other words, the present invention may be composed of a mixing step of mixing an aluminum nitride raw material powder, an additive consisting of a nitride, a sintering aid, a Si additive, an organic binder, and an organic solvent to create a raw material mixture, a forming step of forming the raw material mixture into a compact, a first heating step of heating the compact in a nitrogen atmosphere in a first temperature range to completely debind the organic binder from the compact, and following the first heating step, a sintering step of heating the compact in a nitrogen atmosphere in a third temperature range to sinter the compact.

The present invention is not limited to the embodiments and variants described above, but may be practiced in a variety of aspects so long as they fall within the technical scope of the invention. In other words, the present invention may be modified or altered by those skilled in the art without departing from the technical scope of the invention. For example, other elements and components may be added to the structure of the invention.

The invention claimed is:

1. An aluminum nitride sintered body comprising 100 parts by weight of AlN, 5 to 20 parts by weight on an oxide basis of ZrN, 1 to 10 parts by weight of $Y_2O_3$ as a sintering aid, and 0.025 to 0.15 parts by weight on a Si element basis of a Si component as a Si additive, wherein the sintered body has an oxygen content of 1.8 wt % or less, the sintering aid phase in the aluminum nitride sintered body contains YAM as a crystal phase and does not contain YAG as the crystal phase, a thermal conductivity of 130 W/m·K or higher, and three-point flexural strength is 600 MPa or more.

* * * * *